US007596379B2

(12) United States Patent
Farnsworth et al.

(10) Patent No.: US 7,596,379 B2
(45) Date of Patent: Sep. 29, 2009

(54) METHOD FOR MAINTAINING TRANSPARENT MODE RADIO BEARERS IN A RADIO ACCESS NETWORK (75) Inventors: Andrew John Farnsworth, Bromsgrove (GB); Gjalt de Jong, Leuven (BE)

(73) Assignee: M-Stack Limited, Birmingham (GB)

( * ) Notice: Subject to any disclaimer, the term of this patent is extended or adjusted under 35 U.S.C. 154(b) by 296 days.

(21) Appl. No.: 10/920,155

(22) Filed: Aug. 16, 2004

(65) Prior Publication Data
US 2006/0035642 A1 Feb. 16, 2006

(51) Int. Cl.
*H04W 72/00* (2006.01)
(52) U.S. Cl. .................. 455/450; 455/423; 455/517; 455/451; 455/452.1
(58) Field of Classification Search .......... 455/445, 455/450
See application file for complete search history.

(56) References Cited

U.S. PATENT DOCUMENTS

| 5,946,620 | A | 8/1999 | Schultz et al. ........... 455/435 |
| 6,463,044 | B1 | 10/2002 | Seo ........................ 370/329 |
| 2001/0018342 | A1 | 8/2001 | Vialen et al. ............. 455/423 |
| 2002/0049075 | A1 | 4/2002 | Takagi .................... 455/553 |
| 2002/0068618 | A1 | 6/2002 | Shoobridge ............. 455/574 |
| 2003/0013494 | A1 | 1/2003 | Imura ..................... 455/566 |
| 2004/0017792 | A1 | 1/2004 | Khaleghi et al. ......... 370/335 |
| 2004/0199850 | A1* | 10/2004 | Yi et al. .................. 714/758 |
| 2004/0224688 | A1 | 11/2004 | Fischer ................ 455/435.1 |
| 2004/0229626 | A1* | 11/2004 | Yi et al. .................. 455/450 |
| 2005/0009527 | A1* | 1/2005 | Sharma .................. 455/445 |

FOREIGN PATENT DOCUMENTS

| EP | 1337125 | 8/2003 |
| EP | 1377096 | 1/2004 |
| EP | 1383348 | 1/2004 |

OTHER PUBLICATIONS

"UMTS Radio Resource Control Protocol Specification", ETSI TS 123 331 V3.15.0, Jun. 2003, pp. 1-27, XP002278705.
"Re: UL Transmission During Cell Update", Andy Farnsworth, 3GPP_TSG_RAN_WG2 Archives, Jan. 2003, Online Jan. 28, 2003, pp. 1-2, XP002333085, http://list.3gpp.org/scripts/wa.exe?A2=ind0301&L=3gpp_ran_wg2&T=0&O=A&P=11027.
"Re: Questions, Need Help", Andy Farnsworth, 3GPP_TSG_RAN_WG2 Archives—Dec. 2002, Dec. 19, 2002, pp. 1-2, XP002333086.

* cited by examiner

*Primary Examiner*—Dwayne D. Bost
*Assistant Examiner*—Pierre-Louis Desir
(74) *Attorney, Agent, or Firm*—Allen, Dyer, Doppelt, Milbrath & Gilchrist, P.A.

(57) ABSTRACT

The present invention concerns a method for maintaining transparent mode radio bearers in a Radio Access Network (RAN) of a third generation mobile telecommunications network. The method relates to managing the radio resources allocated to a user equipment (UE) in said radio access network (RAN). The method generally comprises communicating a message from a radio resource controller (RRC) of the RAN to the UE where said message is arranged to instruct the UE to transition from a dedicated channel connection state to a lower activity connection state and to store in its memory transparent mode (TM) radio bearer (RB) information associated with said dedicated channel connection state. By storing TM RB information associated with the dedicated channel connection state, the UE can be reconfigured to the dedicated channel connection state without the RAN having to perform a radio bearer setup procedure.

36 Claims, 7 Drawing Sheets

METHOD FOR MAINTAINING TRANSPARENT MODE RADIO BEARERS IN A RADIO ACCESS NETWORK

FIELD OF THE INVENTION

The present invention generally concerns a next generation mobile communications system and, in particular, to a method for maintaining transparent mode radio bearers in a Radio Access Network (RAN) of such a mobile communications system.

BACKGROUND TO THE INVENTION

In a Radio Resource Control (RRC) arrangement of a User Equipment (UE) and a Radio Access Network (RAN) of a next generation mobile communications system, upon termination of a UE call, the RRC of the RAN sends a radio bearer (RB) release message to the RRC of the UE to discard radio access bearer (RAB) information for one or more transparent mode (TM) RBs used by the UE to transmit and receive user information. The release message may also instruct the UE to transition to one of a number of lower activity connection states. In some of the lower activity connection states, the UE is only able to send and receive information at the RRC level. In the event that the UE is to send or receive user information again, then it is necessary to re-establish RAB information for one or more new TM RBs for the UE. This requires an exchange of RAB establishment messages to be communicated between the UE and RAN. These messages are wasteful of air interface resources, can lead to interference with other UEs, can create an un-necessary delay in returning the UE to a suitable configuration for sending/receiving user information and can increase the possibility of signalling errors between the UE and the RAN.

OBJECT OF THE INVENTION

It is an object of the invention to mitigate and/or obviate problems associated with the known arrangement of a RAN RRC issuing a RB release message to a UE RRC on termination of a UE call.

It is another object of the invention to provide a more efficient method of reconfiguring a released UE call.

It is a further object of the invention to provide a reduced message set between the RAN RRC and the UE RRC on "re-connection" of a UE call.

SUMMARY OF THE INVENTION

In a first main aspect, the present invention provides a method of managing radio resources allocated to a user equipment (UE) in a radio access network (RAN), characterised in that it comprises the step of: communicating a message from a radio resource controller (RRC) of the RAN to the UE, said message being arranged to cause the UE to transition from a first connection state to a second connection state and to store in its memory transparent mode (TM) radio bearer (RB) information associated with said first connection state.

In a second main aspect, the present invention provides a radio access network (RAN), characterised in that it comprises: a radio network controller (RNC) including a radio resources controller (RRC) for managing radio resources allocated to a user equipment (UE) operating within the RAN, said UE communicating with the RNC over an air interface, wherein the RAN RRC is arranged to communicate a message to the UE, said message being arranged to cause the UE to transition from a first connection state to a second connection state and to store in a memory thereof transparent mode (TM) radio bearer (RB) information associated with said first connection state.

In a third main aspect, the present invention provides a radio network controller for a radio access network (RAN) in accordance with the second main aspect of the invention.

In a fourth main aspect, the present invention provides a user equipment (UE), characterised in that it is arranged to be operable within a radio access network (RAN) in accordance with the second main aspect of the invention.

In a fifth main aspect, the present invention provides computer program code embodied on a machine readable medium of a radio network controller (RNC) of a radio access network (RAN) in accordance with the second main aspect of the invention, said computer program code being executable in a processor of the RNC for implementing a method in accordance with the first main aspect of the invention.

In a sixth main aspect, the present invention provides computer program code embodied on a machine readable medium of a user equipment (UE) operable within a radio access network (RAN) in accordance with the second main aspect of the invention, said computer program code being executable in a processor of the UE for implementing a method in accordance with the first main aspect of the invention.

Other features of the present invention will be apparent from the appended claims.

BRIEF DESCRIPTION OF THE DRAWINGS

A description of the present invention will follow with reference to the accompanying drawings, of which.

DETAILED DESCRIPTION OF A PREFERRED EMBODIMENT

The foregoing and further features of the present invention will be more readily understood from a description of a preferred embodiment, by way of example thereof, with reference to the accompanying figures.

The so-called third generation mobile communications system is presently evolving. This is a next generation global mobile communications system that is generally based on the core network technology of the existing Global System for Mobile Communications (GSM). Various telecommunications standards bodies and telecommunications equipment vendors from around the world have agreed to collaborate on what is known as the Third Generation Partnership Project (3GPP). The 3GPP encompasses a number of research fields including the Universal Mobile Telecommunications System (UMTS) Terrestrial Radio Access Network (UTRAN). UMTS is the European form of the third generation mobile communications system.

The following description of the UTRAN with reference to FIGS. 1 to 4 is provided as background to the present invention and by way of explanation thereof and comparison therewith.

Figure 1:
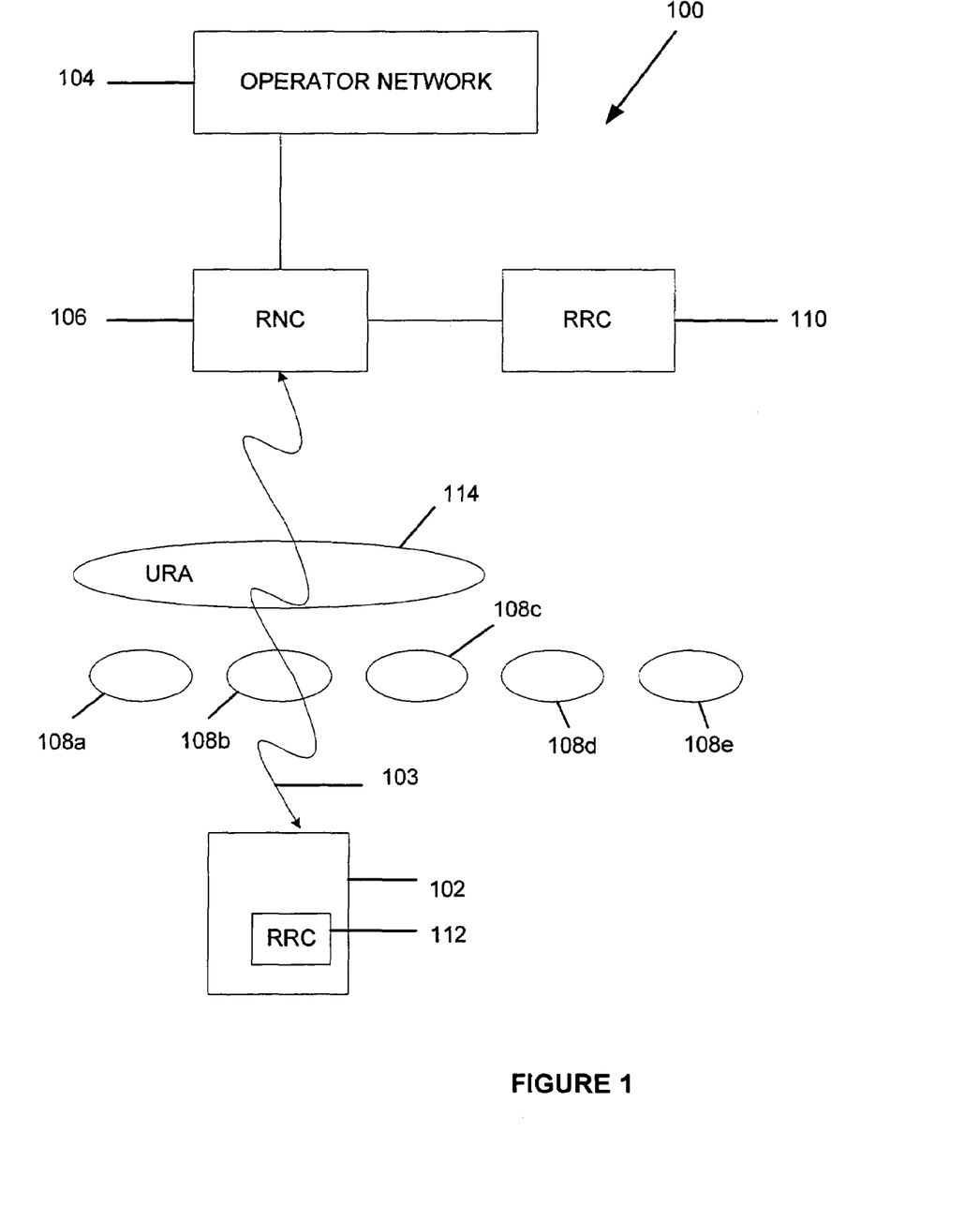
FIG. 1 is a block schematic diagram of a UTRAN system architecture.

Referring to FIG. 1, a UTRAN 100 connects a User Equipment (UE) 102 over a wireless interface 103 to an operator (core) network 104 which provides services to subscribers (users of UEs). The UE 102 may comprise a mobile wireless device as will be familiar to a skilled artisan. The UE 102 is connected to the operator network 104 through a Radio Network Controller (RNC) 106 which controls a plurality of cells 108a-e within which the UE 102 can operate as it moves within respective geographical areas of said cells 108a-e. The UTRAN 100 comprises a number of RNCs 106 although only one is shown in the figure for reasons of convenience.

Each of the RNC 106 and the UE 102 has a respective Radio Resource Controller 110, 112 associated therewith. The RNC RRC 110 provides various functions including establishment, maintenance and release of radio access resources for UEs 102 within the cells controlled by the RNC RRC 110 and may include an information broadcast function for all such UEs 102. The UE RRC 112 co-operates with the RNC RRC 110 to establish, maintain and release radio access resources allocated to its UE 102.

Each cell 108a-e comprises a respective geographical area in which radio coverage is provided by a respective base station or Node B (not shown) located within said cell. The base stations or Node B's are controlled by the RNC 110.

In the UTRAN 100, cells 108a-e can be grouped to provide what might be considered a higher level cell or geographical coverage. A Universal RadioUTRAN Registration Area (URA) may comprise one or more cells 108a-e controlled by an RNC 110 or a number of cells from different RNCs, although the URA 114 as illustrated in FIG. 1 is shown as comprising cells 108a-c for reasons of convenience. There can be many URAs although only one is illustrated.

When the UE 102 is powered on, it initially enters an idle mode. In this mode, the UE 102 is not yet connected to the UTRAN 100. When the RNC RRC 110 and UE RRC 112 co-operate to establish a connection (one or a set of radio bearers) for the UE 102, the UE 102 assumes a connected mode and can occupy one of four connection states within that mode. The four connection states comprise a CELL_DCH state, a CELL_FACH state, a URA_PCH state and a CELL_PCH state as specified in the UMTS specification.

On a dedicated channel connection for a voice call, for example, the UE 102 will be in a CELL_DCH state. In this state, a dedicated physical channel is defined and assigned to the UE 102 and one or more transparent radio bearers may also be defined and assigned to the UE 102. The CELL_DCH state can be considered as a call connection state and is a higher level activity connection state when compared to the other connection states. This connection state can also be considered as the most ready from a user information transmission/reception status but consumes more power than other connection states.

The CELL_FACH state has no dedicated physical channel assigned to the UE 102. In this connection state, the UE 102 listens continuously to a common channel (the FACH) in the downlink belonging to the cell 108b it is operating in and, in the uplink direction, uses a random access channel (RACH). This state uses less power than the CELL_DCH state but is considered less ready for user information transmission/reception than the CELL_DCH state. This connection state comprises one of a number of lower activity connection states within the context of the present invention.

The CELL_PCH state uses even less power than the CELL_FACH state but is considered less ready for user information transmission/reception compared to the CELL_FACH state. In this connection state, the UE 102 monitors a paging channel (PCH) of its cell 108b. On the PCH, the UE 102 uses discontinuous reception to save power. This state also does not have a dedicated channel assigned to the UE 102. This can also be considered as a low activity connection state.

The URA_PCH state is similar to the CELL_PCH state and is also one of the number of low activity connection states.

Figure 2:
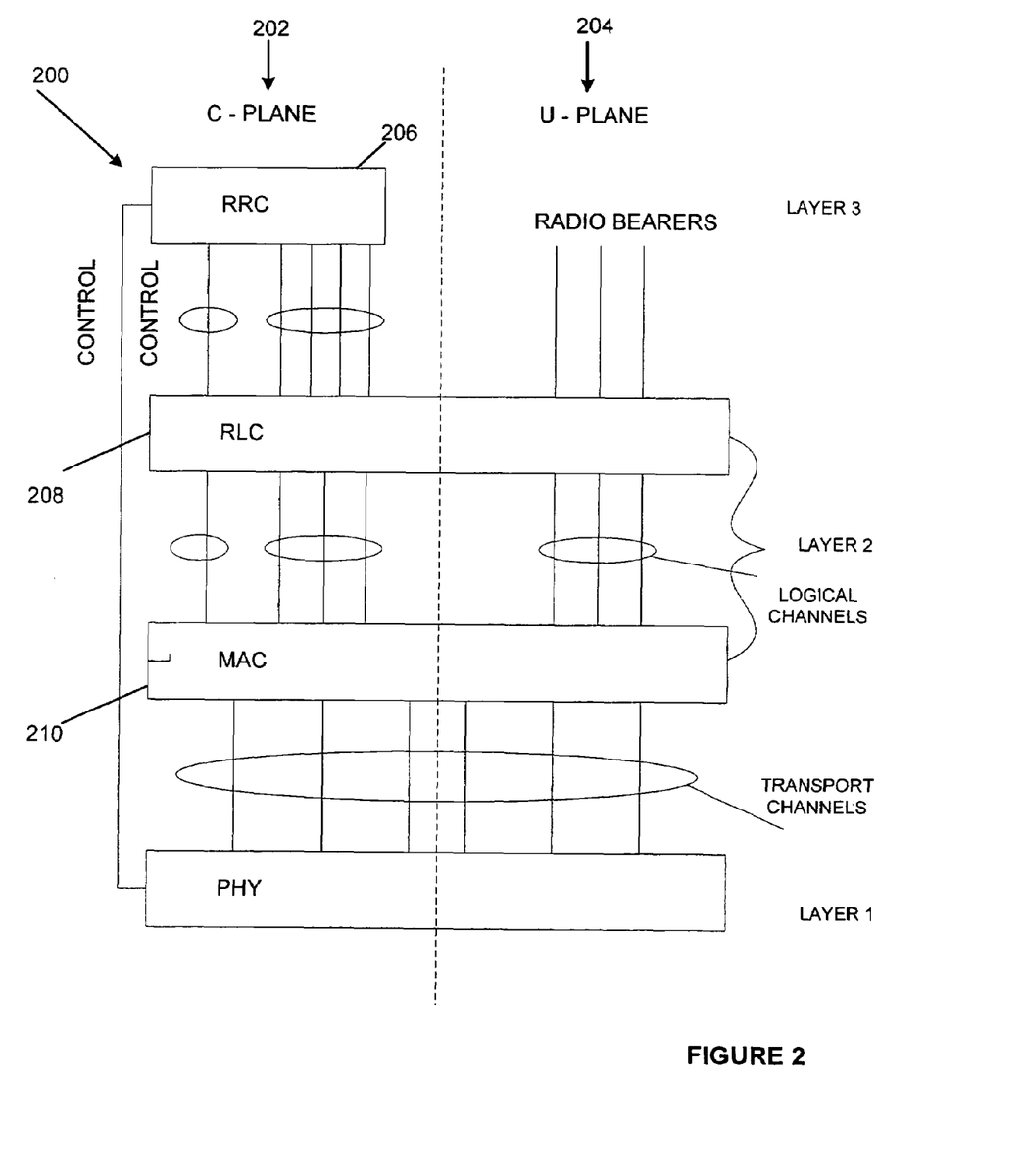
FIG. 2 is a block schematic diagram illustrating a radio interface protocol architecture for the air interface between the UE and the UTRAN.

Referring now to FIG. 2, shown is a 3GPP radio interface protocol architecture 200 for the air interface 103 between the UE 102 and the RNC 106. The protocol architecture 200 comprises a control plane (C-plane) 202 and a user plane (U-plane) 204. The C-plane 202 is used for signalling and the U-plane 204 for transmission of user information. The C-plane 202 includes a RRC Layer 206 at Layer 3 of the protocol architecture and a Radio Link Control (RLC) Layer 208 and a Medium Access Control (MAC) Layer 210 at Layer 2 thereof. The U-plane 204 shares the RLC Layer 208 and the MAC Layer 210 at Layer 2.

The MAC Layer 210 provides the RLC Layer 208 with logical channels. Logical control channels are provided when information for the C-plane 202 is to be transported and traffic channels are provided when user information on the U-plane 204 is to be transported. The MAC Layer 210 also provides a radio resource reconfiguration service when the RNC RRC 110 requests a radio resource reconfiguration or a MAC parameter change.

The RLC Layer 208 provides radio access establishment and release services. The RNC RRC 110 controls the Layer 3 signal processing between the RNC 104 and the UE 102 to establish, maintain and release radio access resources (radio bearers) between the UE 102 and UTRAN 100.

The air interface protocol layers as aforedescribed provide many other services and perform many other functions as will be familiar to a skilled artisan and as described in the UMTS specification relating to the air interface architecture protocol stack.

Figure 3:
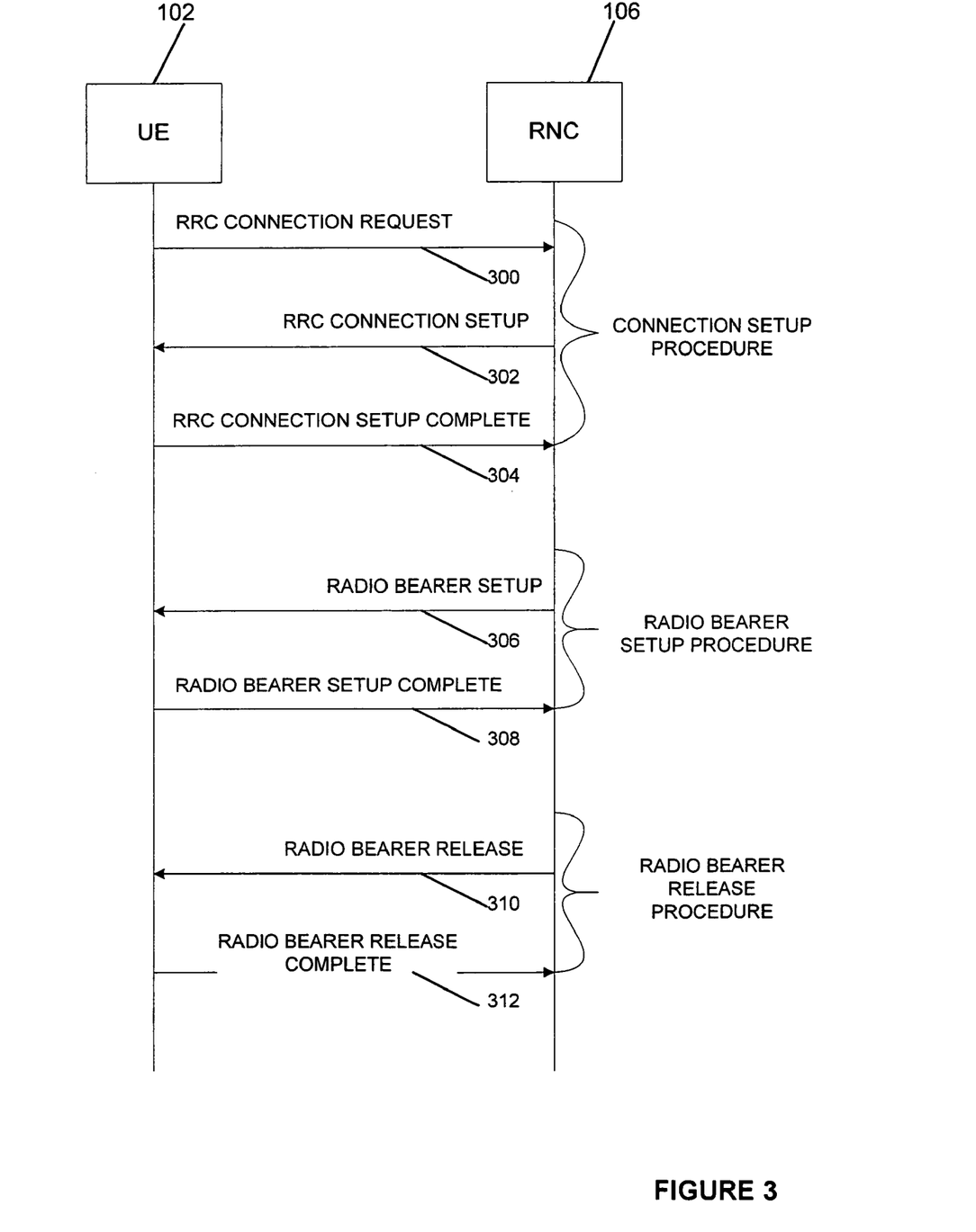
FIG. 3 illustrates RRC signalling relating to the establishment of a transparent mode radio bearer for the UE.

Referring now to FIG. 3, illustrated is the RRC signalling relating to the establishment of one or more TM RBs for the UE 102. The connection establishment procedure is initiated by the UE RRC 112, which sends a RRC connection request message 300 to the RNC 106. The RNC 106 responds with a RRC connection setup message 302 which provides information on various parameters of the connection to be established. The UE 102 completes the connection setup procedure by forwarding a RRC connection setup complete message 304 to the RNC 106.

The connection setup procedure is followed by a transparent mode radio bearer setup procedure initiated by the RNC 106. This comprises the RNC 106 under the control of its RRC 110 forwarding to the UE 102 a radio bearer setup message 306 containing information about parameters of the one or more TM RBs to be established for a UE call. The UE 102 completes the bearer setup procedure by responding to the RNC 106 with a radio bearer setup complete message 308.

On termination of a UE call, the one or more TM RBs are released. This procedure comprises the RNC 106 sending a radio bearer release message 310 to the UE 102. The UE 102 responds with a radio bearer release complete message 312. During the period of the call connection and up to the time of the bearer release procedure 310, 312, the UE 102 occupies the high activity call connection state CELL_DCH having a dedicated channel assigned to it. Upon processing the bearer release message 310, the UE RRC 112 discards RAB information relating to the call and releases the dedicated channel used for the call. This procedure is consistent with the current UMTS specification which prevents existing TM RBs from being re-used after CELL_PCH or URA_PCH states have been entered. The radio bearer release message 310 instructs the UE 102 to transition to the lower activity connection state.

Figure 4:
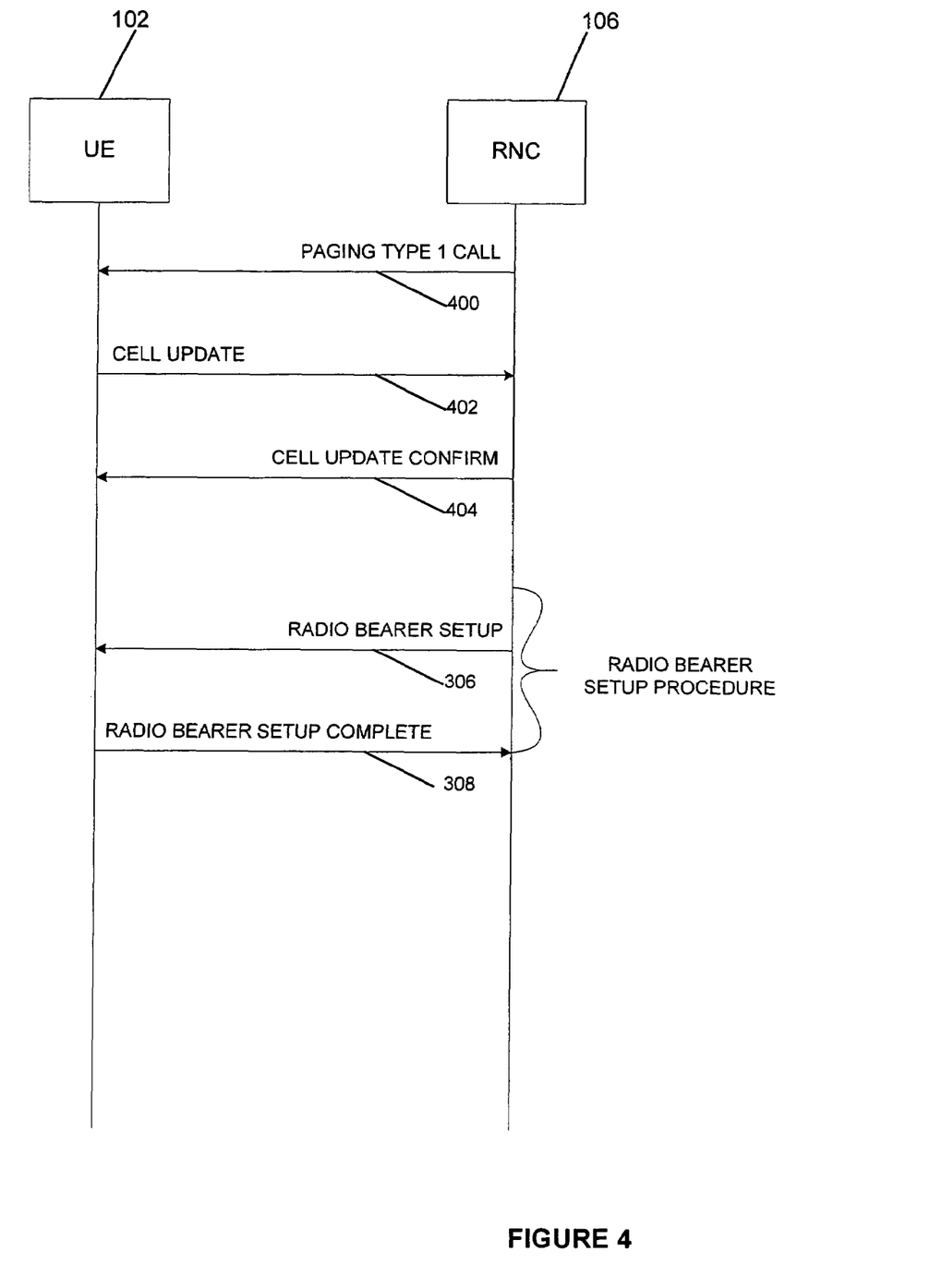
FIG. 4 illustrates RRC signalling relating to the re-establishment of a transparent mode radio bearer for the UE following transition of the UE to a lower activity connection state from a high activity connection state.

After the UE 102 has been transitioned to a lower activity connection state such as the CELL_PCH state, to return the UE 102 to a configuration where a voice call or a streaming data call can be implemented requires the RRC message exchange between the UE 102 and the RNC 106 as illustrated in FIG. 4 for a mobile terminating or network initiated call. This is because the UMTS specification specifies that the UE 102 is to be returned to the idle mode when trying to leave either of the CELL_PCH or URA_PCH states with TM RBs. The message exchange comprises the RNC 106 initiating a paging type 1 message 400 to the UE 102 which prompts the UE 102 to send a cell update message 402 to the RNC 106. The RNC 106 returns with a cell update confirm message 404 before initiating the radio bearer setup procedure (messages 306, 308) as described with respect to FIG. 3.

The message exchange for a mobile originating call is similar and it comprises the UE 102 sending a cell update message 402 to the RNC 106. The RNC 106 returns with a cell update confirm message 404 before initiating the radio bearer setup procedure (messages 306, 308) as described with respect to FIG. 3.

A preferred embodiment of the present invention by way of example thereof will now be described with reference to FIGS. 5 to 8 of the drawings. It will be appreciated, however, that the present invention can be implemented in the UTRAN 100 without modification of the physical structure of said network and thus the foregoing description of the UTRAN 100 with respect to FIGS. 1 to 4 is applicable to the preferred embodiment save where the following description describes alternative method and/or implementations.

A call connection establishment procedure in accordance with the present invention differs from that as described with reference to FIG. 3 in that it modifies or replaces the radio bearer release message 306 to cause the UE 102 not to discard TM RAB information when the UE 102 is transitioned from a high activity connection state having a dedicated channel assigned to it, namely the CELL_DCH state, to a lower activity connection state not having a dedicated channel assigned to it such as either of the CELL_PCH or URA_PCH states, for example.

Figure 5:
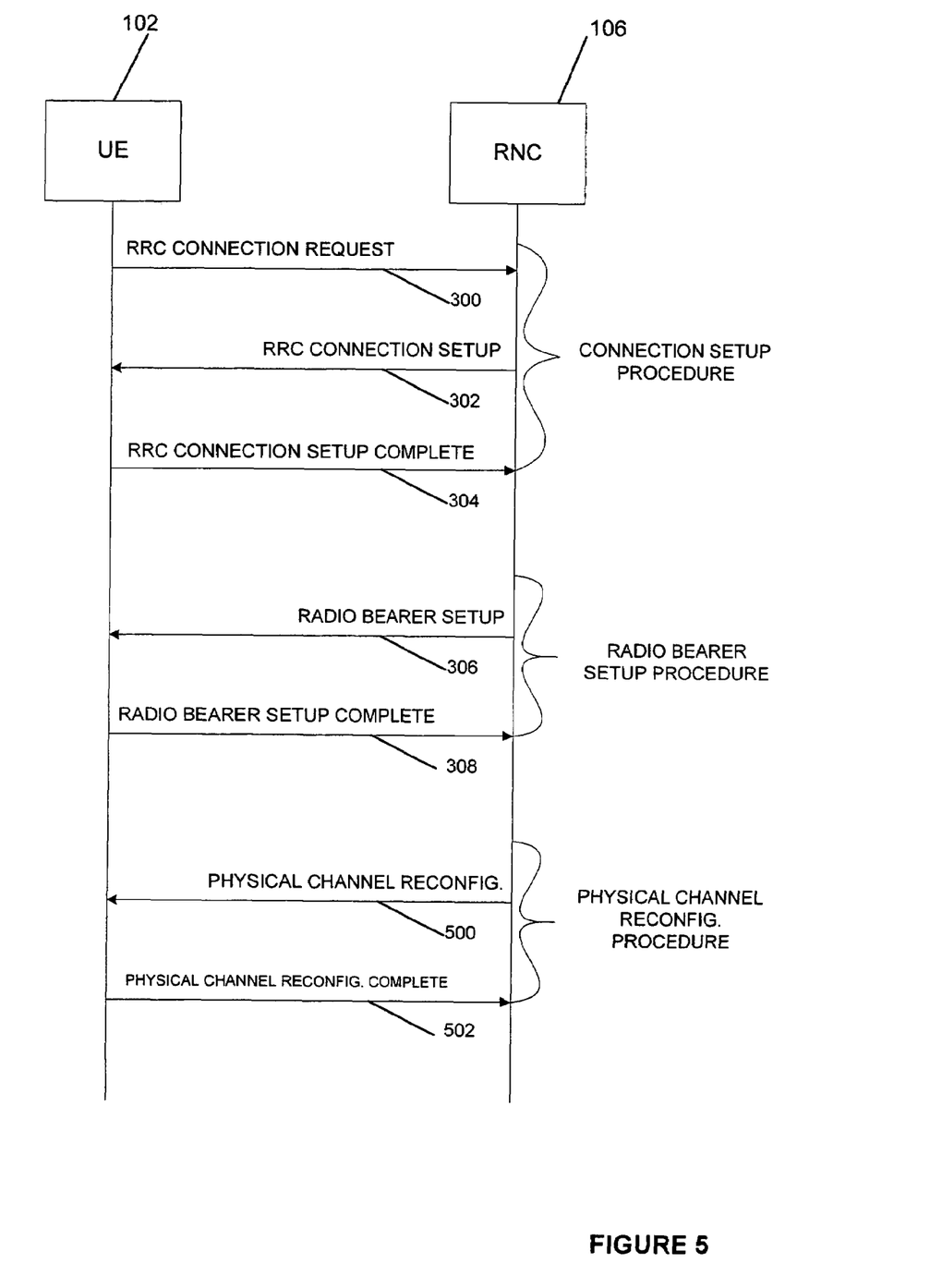
FIG. 5 illustrates RRC signalling relating to the establishment of a transparent mode radio bearer for the UE in accordance with the present invention.

As illustrated in FIG. 5, the modified/replaced bearer release message may comprise a physical channel reconfiguration message 500. The physical channel reconfiguration message 500 is forwarded by the RNC 106 to the UE 102 and arranged to cause the UE 102 not to delete TM RB information associated with the high activity connection state whilst releasing the physical channel assigned to carry the TM RBs for said high activity connection state. The physical channel reconfiguration message 500 instructs the UE 102 to discard physical channel information from radio access bearer (RAB) information already stored by the UE 102. In effect, the RNC 106 moves the connection state of the UE 102 from its high activity connection state, i.e. a connection state in which the UE 102 has a dedicated channel assigned to it, to one of a number of lower activity connection states not involving a dedicated channel without releasing the TM RBs associated with said high activity connection state without explicitly instructing the UE 102 to maintain TM RB information but equally without causing or instructing said UE 102 to discard said information. One advantage of this arrangement is that the physical channel reconfiguration message 500 is smaller in size than the UMTS specified radio bearer release message 306 and so may use less air interface 103 resources, may be transmitted with improved reliability, or may cause less interference. The UE 102 responds to receipt of the physical channel reconfiguration message 500 with a physical channel reconfiguration complete message 502.

In an alternative arrangement, the message 500 explicitly instructs the UE 102 to store existing TM RB information associated with the first connection state or to maintain such information in its memory when transitioning from a high activity connection state to a lower activity connection state.

In another alternative arrangement, the message 500 may comprise a radio bearer reconfiguration message or a transport channel reconfiguration message instructing the UE 102 to replace its existing TM RBs with new TM RBs whilst releasing the dedicated physical channel assigned to it as it transitions to a lower activity connection state.

Transmission of the message 500 to the UE 102 may be initiated by the RNC 106 detecting termination of a voice call by the UE 102 or detecting a period of inactivity on the dedicated channel assigned to the UE 102. A period of inactivity may comprise a silent period detected in a data streaming connection, for example.

After sending the physical channel reconfiguration message 500, the UTRAN 100 may keep the UE 102 in a low activity connection state for a period of time before a radio bearer release procedure 310, 312 is initiated. The radio bearer release procedure may be initiated by the RNC RRC 110 after a predetermined period of time or in response to events such as congestion in the cell 108b the UE 102 is operating in or other network events.

An advantage of this arrangement is that, where the UE 102 has had its connection state transitioned by the RNC 104 from a high activity state associated with a data streaming connection to a lower activity state in response to a silent period detected in the data streaming connection, the retention by the UE 102 of the TM RB information for a period of time allows the high activity data connection to be readily re-established once data begins to flow again without the need for a radio bearer setup procedure to be implemented. Consequently, the period of time may be chosen as any suitable period and may be one that is statistically just longer than a longest silent period detected in a data stream that has been communicated over the TM RBs during a sampling period.

Figure 6:
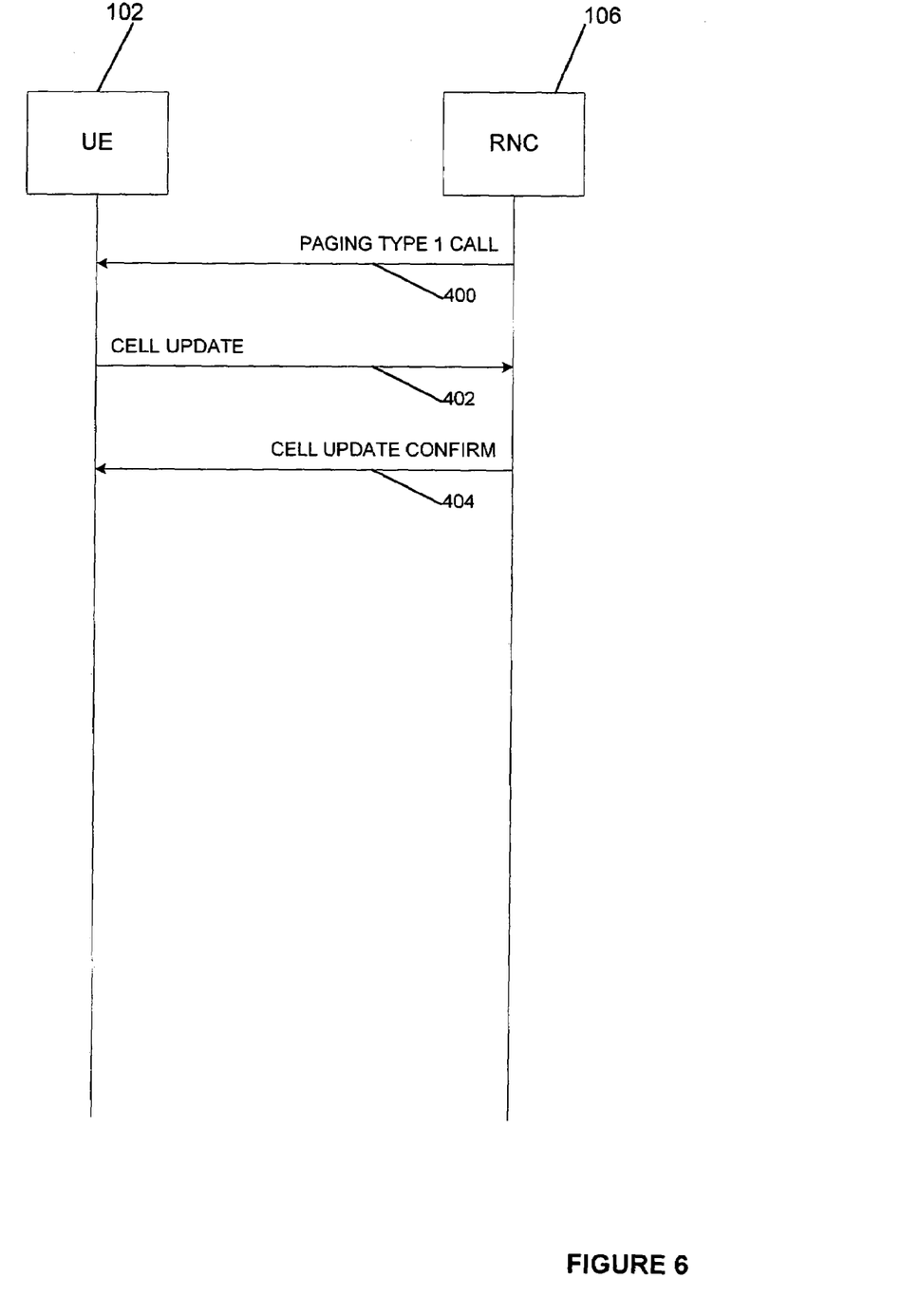
FIG. 6 illustrates RRC signalling relating to the re-establishment of a transparent mode radio bearer for the UE following transition of the UE to a lower activity connection state from a high activity connection state in accordance with the present invention.

In order to re-establish the high activity connection (dedicated channel) state for the UE 102 in accordance with the preferred embodiment of the present invention, it is only necessary for the UE 102 to send to the RNC 106 a cell update message 402 as illustrated in FIG. 6. The sending of this cell update message 402 may be prompted by receipt at the UE 102 of a paging type 1 message 400 from the RNC 106 on the CELL_PCH connection or URA_PCH connection between the UE 102 and the UTRAN 100. The RNC 106 responds to the cell update message 402 with a cell update confirm message 404. It will be seen that this message exchange between the RNC 106 and UE 102 effectively comprises the first part of the known message exchange described with respect to FIG. 4 and consequently like numerals have been employed in FIG. 6 to those employed in FIG. 4. It will, however, be noted that in the arrangement in accordance with the present invention, it is not necessary to perform the radio bearer setup procedure 306, 308 since the UE 102 already has the necessary TM RB information previously established for the dedicated channel connection. Therefore, the number and size of messages exchanged by the UE 102 and RNC 104 to re-establish the high activity connection is smaller than in the case described with respect to FIG. 4. By using fewer messages and smaller messages, less connection re-establishment data is transferred over the air interface 103 which reduces the likelihood of interference with other UEs, reduces the likelihood of signalling errors or signalling collisions and speeds up the transition of the UE 102 to a dedicated channel connection.

When re-establishing the dedicated channel state for the UE 102 by causing it to transition from either of the CELL_PCH or URA_PCH states to the CELL_DCH state, it is necessary to arrange the UE 102 to only process signalling radio bearers and delay processing of non-signalling RBs including TM RBs until the UE 102 receives the cell update confirm message 404 in response to having sent the cell update message 402. This is because under the current UMTS specification it is possible to transition a UE from either a CELL_PCH state or a URA_PCH state with RBs to the CELL_DCH state but the transition must be via the CELL_FACH state. However, when transitioning to the CELL_FACH state, the UMTS specification requires that all RBs must have a valid mapping to the UMTS RACH and FACH transport channels but this is not possible under the current specification for TM RBs. Consequently, in the arrangement in accordance with the invention, the UE 102 after sending the cell update message 402 and when transitioning to the CELL_FACH state is arranged to only check signalling RBs and to delay checking non-signalling RBs until the UE 102 receives the cell update confirm message 404 from the RNC 106. The UE 102 can then perform the necessary checks on non-signalling RBs since the RNC 106 has now had an opportunity to remedy the lack of valid mappings, e.g. by moving the UE 102 to the high activity state, i.e. the CELL_DCH state.

Figure 7:
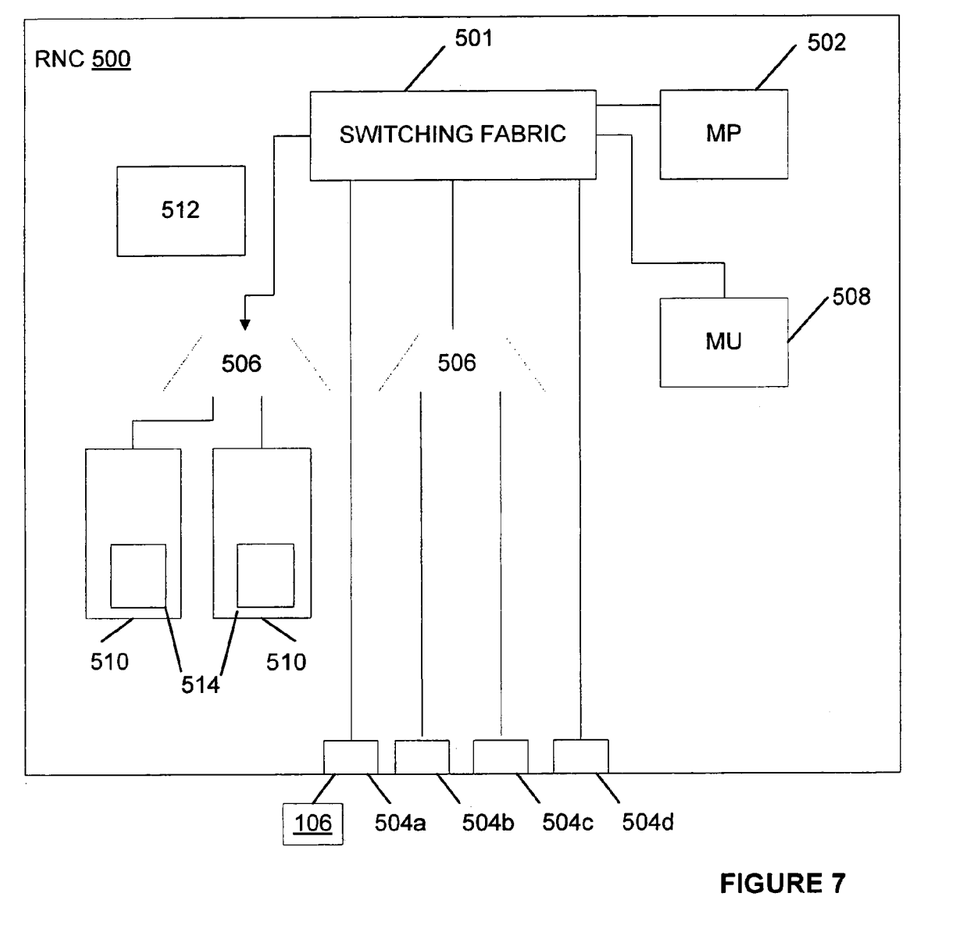
FIG. 7 is a schematic block diagram illustrating the functional structure of a RNC for implementing the present invention.

FIG. 7 is a schematic block diagram illustrating the functional structure of a RNC 500 suitable as part of a UTRAN 100 for implementing the present invention.

The RNC 500 comprises a switching fabric 501 and at least one control processor 502 connected thereto. The RNC 500 includes a plurality of network interfaces 504 which form the physical layer connections between the RNC 500 and external systems. Such interfaces may include a UTRAN Iu interface 504a for interfacing with an operator (core) network 106, one or more UTRAN Iur interfaces 504b for interfacing with other RNCs of the UTRAN 100 and one or more Iub interfaces 504c for interfacing with Node Bs or base stations and one or more Iux interfaces 504d for interfacing with other external nodes. Multiplexer units 506 connect the interfaces 504 to the switch fabric 501 and convey data flows to the input ports of the switch fabric 501. A management unit 508 for the RNC 500 contains the RNC configuration information for UTRAN radio resources controlled by the RNC 500. A plurality of signalling units 510 (only two are shown) implement the control and user plane protocols required by the RNC 500 and, as such, the present invention is implemented in such units through execution of suitable computer program code stored in a memory 512 of the RNC 500 by processors 514 of the signalling units 510.

Figure 8:
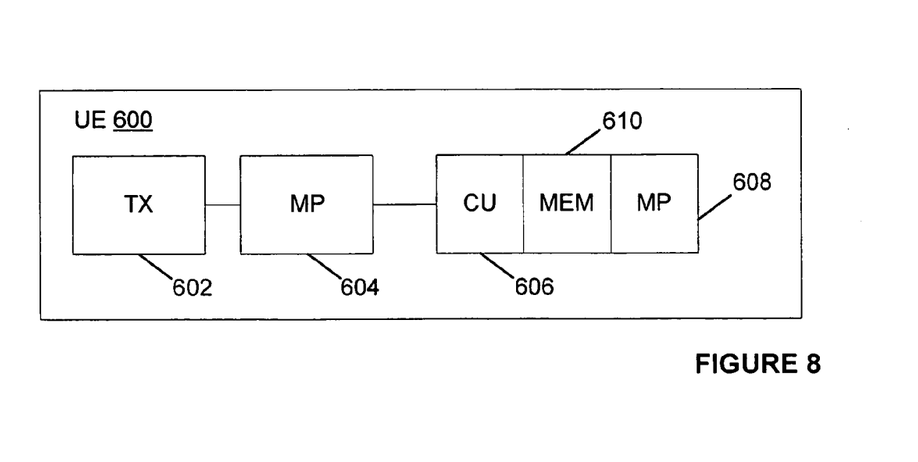
FIG. 8 is a schematic block diagram of the functional structure of a UE for implementing the present invention.

FIG. 8 is a schematic block diagram of the functional structure of a UE 600 suitable for implementing the present invention within the UTRAN 100.

The UE 600 comprises a transceiver 602 which attends to radio frequency processing of information transmitted and received by the UE 600. The UE 600 also has a processing unit 604 for attending to physical layer protocol processing and some layer 2 protocols such as the MAC and RLC. A control unit 606 having a processor 608 and a memory 610 attends to layer 3 protocol processing such as the RRC protocol. As such, the present invention is implemented within the control unit 606 through the execution of suitable computer program code in the processor 608.

In summary, the present invention concerns a method for maintaining transparent mode radio bearers in a Radio Access Network (RAN) of a third generation mobile telecommunications network. The method relates to managing the radio resources allocated to a user equipment (UE) in said radio access network (RAN). The method generally comprises communicating a message from a radio resource controller (RRC) of the RAN to the UE where said message is arranged to instruct the UE to transition from a dedicated channel connection state to a lower activity connection state and to store in its memory transparent mode (TM) radio bearer (RB) information associated with said dedicated channel connection state. By storing TM RB information associated with the dedicated channel connection state, the UE can be reconfigured to the dedicated channel connection state without the RAN having to perform a radio bearer setup procedure.

We claim:

1. A method of managing radio resources allocated to a user equipment (UE) in a radio access network (RAN), comprising:
    communicating a message from a radio resource controller (RRC) of the RAN to the UE, said message being arranged to cause the UE to transition from a dedicated channel connection state to a non-dedicated channel connection state while releasing a physical channel assigned to carry transparent mode (TM) radio bearers (RBs) for said dedicated channel connection state and to not discard from its memory TM RB information associated with said dedicated channel connection state for a period of time after the UE has transitioned to the non-dedicated channel connection state, said message being initiated by detection of a period of inactivity on a dedicated channel assigned to said dedicated channel connection state.

2. A method as claimed in claim 1, wherein the message communicated to the UE causes the UE to not discard TM RB information associated with said dedicated channel connection state by instructing the UE to discard physical channel information from radio access bearer (RAB) information currently being stored by the UE thereby leaving current TM RB information associated with said dedicated channel connection state.

3. A method as claimed in claim 1, wherein the message communicated to the UE instructs the UE to not discard TM RB associated with said dedicated channel connection state by retaining that part of radio access bearer (RAB) information currently being stored by the UE comprising TM RB information associated with said dedicated channel connection state.

4. A method as claimed in claim 1, wherein the message comprises a physical channel reconfiguration message.

5. A method as claimed in claim 1, wherein the message communicated to the UE instructs the UE to store new TM RB information for the dedicated channel connection state, said new TM RB information being provided by the RAN RRC in replacement of existing TM RB information associated with said dedicated channel connection state currently being stored by the UE.

6. A method as claimed in claim 5, wherein the message comprises a radio bearer reconfiguration message.

7. A method as claimed in claim 5, wherein the message comprises a transport channel reconfiguration message.

8. A method as claimed in claim 1, wherein the non-dedicated channel connection state comprises one of a number of non-dedicated channel connection states.

9. A method as claimed in claim 1, wherein in order to re-transition the UE from the non-dedicated channel connection state to the dedicated channel connection state, the method includes the UE sending a cell update message to the RAN RRC whereby the UE uses the stored TM RB information in co-operation with the RAN RRC to re-establish the dedicated channel connection state.

10. A method as claimed in claim 1, wherein the RAN comprises a Universal Mobile Communications System Terrestrial Radio Access Network (UTRAN).

11. A method as claimed in claim 10, wherein the dedicated channel connection state comprises a CELL_DCH state.

12. A method as claimed in claim 10, wherein the non-dedicated channel connection state comprises a CELL_PCH or a URA_PCH state.

13. A radio access network (RAN), comprising:
a radio network controller (RNC) including a radio resources controller (RRC) for managing radio resources allocated to a user equipment (UE) operating within the RAN, said UE communicating with the RNC over an air interface, wherein the RAN RRC is arranged to communicate a message to the UE, said message being arranged to cause the UE to transition from a dedicated channel connection state to a non-dedicated channel connection state while releasing a physical channel assigned to carry transparent mode (TM) radio bearers (RBs) for said dedicated channel connection state and to not discard from a memory thereof TM RB information associated with said dedicated channel connection state for a period of time after the UE has transitioned to the non-dedicated channel connection state, said message being initiated by detection of a period of inactivity on a dedicated channel assigned to said dedicated channel connection state.

14. A RAN as claimed in claim 13, wherein the RNC is arranged to communicate the message to the UE in a form that causes the UE to not discard TM RB information associated with said dedicated channel connection state by instructing the UE to discard physical channel information from radio access bearer (RAB) information currently being stored by the UE thereby leaving current TM RB information associated with said dedicated channel connection state.

15. A RAN as claimed in claim 13, wherein the RNC is arranged to communicate the message to the UE in a form that instructs the UE to not discard TM RB associated with said dedicated channel connection state by retaining that part of radio access bearer (RAB) information currently being stored by the UE comprising TM RB information associated with said dedicated channel connection state.

16. A RAN as claimed in claim 13, wherein the RNC is arranged to communicate the message to the UE as a physical channel reconfiguration message.

17. A RAN as claimed in claim 13, wherein the RNC is arranged to communicate the message to the UE in a form that instructs the UE to store new TM RB information for the dedicated channel connection state, said new TM RB information being provided by the RAN RRC in replacement of existing TM RB information associated with said dedicated channel connection state currently being stored by the UE.

18. A RAN as claimed in claim 17, wherein the RNC is arranged to communicate the message to the UE as a radio bearer reconfiguration message.

19. A RAN as claimed in claim 17, wherein the RNC is arranged to communicate the message to the UE as a transport channel reconfiguration message.

20. A RAN as claimed in claim 13, wherein the non-dedicated channel connection state comprises one of a number of non-dedicated channel connection states.

21. A RAN as claimed in claim 13, wherein UE is arranged to send a cell update message to the RAN RRC in order to re-transition the UE from the non-dedicated channel connection state to the dedicated channel connection state, whereby the UE uses the stored TM RB information in co-operation with the RAN RRC to re-establish the dedicated channel connection state.

22. A RAN as claimed in claim 13, wherein the RAN comprises a Universal Mobile Communications System Terrestrial Radio Access Network (UTRAN).

23. A RAN as claimed in claim 22, wherein the dedicated channel connection state comprises a CELL_DCH state.

24. A RAN as claimed in claim 22, wherein the non-dedicated channel connection state comprises a CELL_PCH or a URA_PCH state.

25. A radio network controller (RNC), comprising:
a radio resources controller (RRC) for managing radio resources allocated to a user equipment (UE) operating within a radio access network (RAN), said RNC communicating with the UE over an air interface, wherein the RAN RRC is arranged to communicate a message to the UE, said message being arranged to cause the UE to transition from a dedicated channel connection state to a non-dedicated channel connection state while releasing a physical channel assigned to carry transparent mode (TM) radio bearers (RBs) for said dedicated channel connection state and to not discard from a memory thereof TM RB information associated with said dedicated channel connection state for a period of time after the UE has transitioned to the non-dedicated channel connection state, said message being initiated by detection of a period of inactivity on a dedicated channel assigned to said dedicated channel connection state.

26. A user equipment (UE) operable within a radio access network (RAN), comprising:
a controller arranged to process a transition message received from a radio resources controller (RRC) of said RAN;
wherein, on processing said message, said UE is caused to transition from a dedicated channel connection state to a non-dedicated channel connection state while releasing a physical channel assigned to carry transparent mode (TM) radio bearers (RBs) for said dedicated channel connection state and to not discard from a memory thereof TM RB information associated with said dedicated channel connection state for a period of time after the UE has transitioned to the non-dedicated channel connection state, said message being initiated by detection of a period of inactivity on a dedicated channel assigned to said dedicated channel connection state.

27. A UE as claimed in claim 26, wherein said UE is arranged to delay processing of non-signaling RBs on transitioning back to said dedicated channel connection state from said non-dedicated channel connection state.

28. A UE as claimed in claim 26, wherein said UE is arranged to process only signaling RBs on transitioning back to said dedicated channel connection state from said non-dedicated channel connection state and to delay processing of non-signaling RBs until receipt of a message from the RNC.

29. A user equipment (UE) operable within a radio access network (RAN), comprising:
  a memory storing signaling radio bearers (RBs) associated with a dedicated channel connection state in a memory of said UE when transitioning from said dedicated channel connection state to a non-dedicated channel connection state while releasing a physical channel assigned to carry transparent mode (TM) RBs for said dedicated channel connection state;
  said UE being arranged to not discard said signaling radio bearers (RBs) associated with said dedicated channel connection state for a period of time after the UE has transitioned to the non-dedicated channel connection state, and to process only said signaling radio bearers (RBs) associated with said dedicated channel connection state on transitioning from said non-dedicated channel connection state to said dedicated channel connection state.

30. A UE as claimed in claim 29, wherein said UE is arranged to delay processing of non-signaling RBs until receipt of a message from a radio network controller (RNC).

31. A machine readable medium carrying a computer program for a radio network controller (RNC) of a radio access network (RAN), code of said computer program being executable in a processor of the RNC for implementing a method comprising:
  communicating a message from a radio resource controller (RRC) of the RAN to the user equipment (UE), said message being arranged to cause the UE to transition from a dedicated channel connection state to a non-dedicated channel connection state while releasing a physical channel assigned to carry transparent mode (TM) radio bearers (RBs) for said dedicated channel connection state and to not discard from its memory TM RB information associated with said dedicated channel connection state for a period of time after the UE has transitioned to the non-dedicated channel connection state, said message being initiated by detection of a period of inactivity on a dedicated channel assigned to said dedicated channel connection state.

32. A machine readable medium carrying a computer program for a user equipment (UE) operable within a radio access network (RAN), code of said computer program being executable on a processor of the UE for implementing a method comprising:
  processing a transition message received from a radio resources controller (RRC) of said RAN, wherein, on processing said message, said UE is caused to transition from a dedicated channel connection state to a non-dedicated channel connection state while releasing a physical channel assigned to carry transparent mode (TM) radio bearers (RBs) for said dedicated channel connection state and to not discard from a memory thereof TM RB information associated with said dedicated channel connection state for a period of time after the UE has transitioned to the non-dedicated channel connection state, said message being initiated by detection of a period of inactivity on a dedicated channel assigned to said dedicated channel connection state.

33. A method as claimed in claim 1, wherein detecting a period of inactivity on the dedicated channel assigned to the dedicated channel connection state comprises detecting a silent period in a data streaming connection.

34. A RAN as claimed in claim 13, wherein detecting a period of inactivity on the dedicated channel assigned to the dedicated channel connection state comprises detecting a silent period in a data streaming connection.

35. A RNC as claimed in claim 25, wherein detecting a period of inactivity on the dedicated channel assigned to the dedicated channel connection state comprises detecting a silent period in a data streaming connection.

36. A UE as claimed in claim 26, wherein detecting a period of inactivity on the dedicated channel assigned to the dedicated channel connection state comprises detecting a silent period in a data streaming connection.

* * * * *